United States Patent
Wang et al.

(10) Patent No.: US 7,099,529 B2
(45) Date of Patent: Aug. 29, 2006

(54) FLEXIBLE BAND TUNABLE FILTER

(75) Inventors: Ting Wang, Princeton, NJ (US); Philip Nan Ji, Princeton, NJ (US); Lane Zong, Plainsboro, NJ (US); Osamu Matsuda, Chiba (JP); Kojiro Watanabe, West Windsor, NJ (US)

(73) Assignees: NEC Laboratories America, Inc., Princeton, NJ (US); NEC Corporation, (JP)

( * ) Notice: Subject to any disclaimer, the term of this patent is extended or adjusted under 35 U.S.C. 154(b) by 243 days.

(21) Appl. No.: 10/810,632

(22) Filed: Mar. 26, 2004

(65) Prior Publication Data

US 2005/0213879 A1 Sep. 29, 2005

(51) Int. Cl.
*G02B 6/26* (2006.01)
(52) U.S. Cl. .......................................... 385/24; 385/148
(58) Field of Classification Search ................. 385/14, 385/16, 24, 31, 39, 41, 43, 147
See application file for complete search history.

(56) References Cited

U.S. PATENT DOCUMENTS

| | | | |
|---|---|---|---|
| 4,861,136 A | | 8/1989 | Stone et al. |
| 6,486,984 B1 * | | 11/2002 | Baney et al. ................ 398/212 |
| 6,583,873 B1 * | | 6/2003 | Goncharov et al. ......... 356/326 |
| 6,853,452 B1 * | | 2/2005 | Laufer ........................ 356/436 |
| 2002/0186434 A1 | | 12/2002 | Roorda et al. |
| 2002/0196816 A1 * | | 12/2002 | Shirasaki ..................... 372/20 |
| 2003/0185565 A1 | | 10/2003 | Wang et al. |
| 2004/0086218 A1 * | | 5/2004 | Liu et al. ...................... 385/18 |

OTHER PUBLICATIONS

Sadot D. et al., "Tunable Optical Fibers for Dense WDM Networks", IEEE Communications Magazine, Dec. 1998.*
Borella, M.S. et al., "Optical Components for WDM Lightwave Networks", Proceedings of the IEEE, vol. 85, No. 8, Aug. 1997.
Elmirghani, J.M.H. et al., "Technologies and Architectures for Scalable Dynamic Dense WDM Networks", IEEE Communication Magazine, Feb. 2000.
Sadot, D. et al., "Tunable Optical Filters for Dense WDM Networks", IEEE Communications Magazine, Dec. 1998.
Dutton, H.J.R. "Understanding Optical Communications", pp. 149-156 and 205-261, Sep. 1998.
Hibino, Y., "An Array of Photnic Filtering Advantages", Circuits and Devices, IEEE Nov. 2000.

* cited by examiner

*Primary Examiner*—Akm Enayet Ullah
(74) *Attorney, Agent, or Firm*—Benjamin Lee

(57) ABSTRACT

A flexible band tunable filter design is disclosed which is capable of selecting any single channel or multiple of adjacent channels in a waveband of an optical signal in an optical communication network. The flexible band tunable filter has particular application in wavelength division multiplexing communication networks.

15 Claims, 19 Drawing Sheets

(A) Transmit/Drop port (B) Reflect/Express port (A) Transmit/Drop port (B) Reflect/Express port

FLEXIBLE BAND TUNABLE FILTER

BACKGROUND OF THE INVENTION

The invention relates to optical communication, and, more particularly, to variable wavelength optical filters for use in optical communications.

A leading technology for use in next generation high-speed communication networks has been wavelength division multiplexing (WDM) or its variations such as Dense-WDM. See, e.g., M. S. Borella, J. P. Jue, D. Banerjee, et al., "Optical Components for WDM Lightwave Networks," Proceedings of the IEEE, Vol. 85, No. 8, pp. 1274–1307, August 1997, the contents of which are incorporated by reference herein. In a WDM system, multiple signal sources are emitted at different wavelengths and multiplexed onto the same optical medium, each wavelength representing a separate channel. Due to the dynamic change of traffic patterns and the demand for intelligent switching, it is advantageous to incorporate capabilities to select a specific channel or range of channels from the multiple wavelength bands carried by the optical network. Accordingly, tunability has been one of the most important challenges in a WDM optical network.

Conventional tunable filters have employed a range of techniques, such as Fabry-Perot interference, Mach-Zehnder interference, thin film interference, etc. See, e.g., J. M. H. Elmirghani, H. T. Mouftah, "Technologies and Architectures for Scalable Dynamic Dense WDM Networks," IEEE Communications Magazine, pp. 58–66, February 2000; D. Sadot and E. Boimovich, "Tunable Optical Filters for Dense WDM Networks," IEEE Communications Magazine, p. 50–55, December 1998, which are incorporated by reference herein. Unfortunately, while conventional tunable filters have proven to be flexible in the selection of the wavelength of the passband (single channel or waveband) from the input optical signal to pass through, the width of the passband (number of channels) on the other hand has generally been fixed. Recently, more complicated solutions have been suggested and implemented, such as what are commonly referred to as "wavelength selective switches" (WSS). See, e.g., U.S. Patent Application Publication 2002/0186434, Ser. No. 10/140,116, the contents of which are incorporated by reference herein. Although highly flexible in their switching and tuning capabilities, wavelength selective switches are, in general, expensive and often have limited scalability.

Accordingly, there is a need for an approach that is more flexible than existing tunable filters but that is also more inexpensive and scalable than existing wavelength selective switch architectures.

SUMMARY OF INVENTION

The present invention is directed to a novel device for an optical communication network that advantageously has a tunable passband, tunable both in passband width and spectrally. In accordance with an embodiment of the invention, the device is comprised in part of two components which the inventors refer to as tunable "edge" filters. The edge filters each serve to drop a range of channels in the operating spectrum, acting like a high and low pass filter respectively. The edge filters can be implemented using conventional filtering techniques and can be, for example, simple bandpass filters with a wide passband having a rising or falling edge outside the operating spectrum. The first tunable edge filter receives an input signal and drops a first range of channels in the input signal. Then, the second tunable edge filter receives the dropped signal form the first tunable edge filter and drops a second range of channels from the dropped signal. The intersection between the first range of channels and the second range of channels defines the tunable passband for the device. The device can be tuned in two degrees of freedom, expressed for example as the rising and falling edge of the passband (or as the width and center channel of the passband). The device advantageously can drop any arbitrary single channel or any plurality of adjacent channels in a waveband.

In accordance with another embodiment of the present invention, the rejected signals from the first tunable edge filter and the second tunable edge filter can be combined to create an output signal that includes all the channels not in the tunable passband for the device. This is accomplished using a combiner or a coupler or, alternatively and preferably, a third tunable edge filter which provides better optical performance.

In accordance with another embodiment of the present invention, the device comprises a grating which separates the wavelengths into a spectrally dispersed band. A pair of movable shutters can then be used to block portions of the band to define a tunable passband for the device. In a preferred embodiment, the channels not blocked by the shutters can then be reflected by a mirror back to the grating and sent to a circulator that directs the channels to a drop port.

The present invention simplifies the architecture of switching nodes in an optical communication network. It also increases the flexibility of node control, node performance, scalability, and optical performance, all while significantly reducing the cost of a switching node depending on the node capacity and network traffic. These and other advantages of the invention will be apparent to those of ordinary skill in the art by reference to the following detailed description and the accompanying drawings.

DETAILED DESCRIPTION

Figure 1:
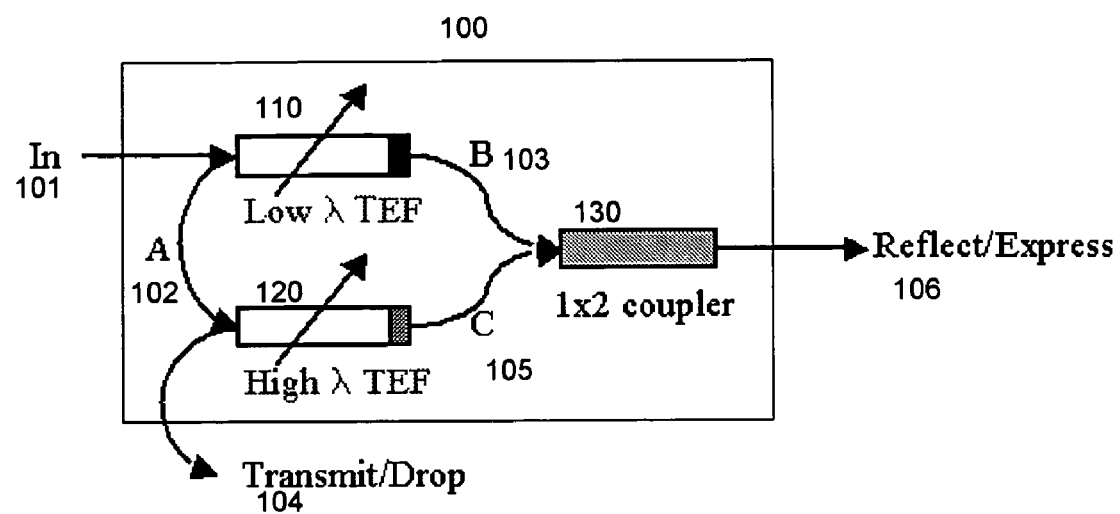
FIG. 1 is a schematic representation of the components of a flexible band tunable filter, in accordance with an embodiment of the present invention.

FIG. 1 is a schematic representation of the components of what the inventors refer to as a "flexible band tunable filter" 100, in accordance with an embodiment of the present invention. The basic design utilizes two stage wide band tunable filters 110, 120 to comprise the rising and falling edges of the filter. These tunable filters 110, 120 are referred to herein by the inventors as tunable "edge" filters, because each filter has only one edge (either a falling edge or a rising edge) within the operating spectrum. The edge filters 110, 120 operate like low and high pass filters, allowing the whole lower (or higher) wavelength spectrum to pass while reflecting the spectrum with a higher (or lower) wavelength. The edge filters can be implemented using any of a wide array of known techniques for filtering of optical signals. For example, and without limitation, most common optical filters utilize a conventional Fabry-Perot interferometer, a thin-film Fabry-Perot interferometer, a bulk diffraction grating, a fiber Bragg grating, a Mach-Zehnder interferometer, or a planar lightwave circuit (PLC) such as an arrayed waveguide grating (AWG). See, e.g., H. J. R. Dutton, "Understanding Optical Communications," pp. 149–56, 205–61 (September 1998); J. M. H. Elmirghani, H. T. Mouftah, "Technologies and Architectures for Scalable Dynamic Dense WDM Networks," IEEE Communications Magazine, pp. 58–66, February 2000, which are incorporated by reference herein. A wide array of known tuning techniques can also be utilized, for example using acousto-optic, electro-optic, or magneto-optic effects.

As depicted in FIG. 1, a low wavelength tunable edge filter 110 and a high wavelength tunable edge filter 120 are connected in series. The two edge filters 110, 120 serve to drop a range of channels above or below a particular edge of their respective passbands. The intersection of the passbands of these two tunable edge filters 110, 120 makes up the passband of the flexible band tunable filter 100.

Figure 2:
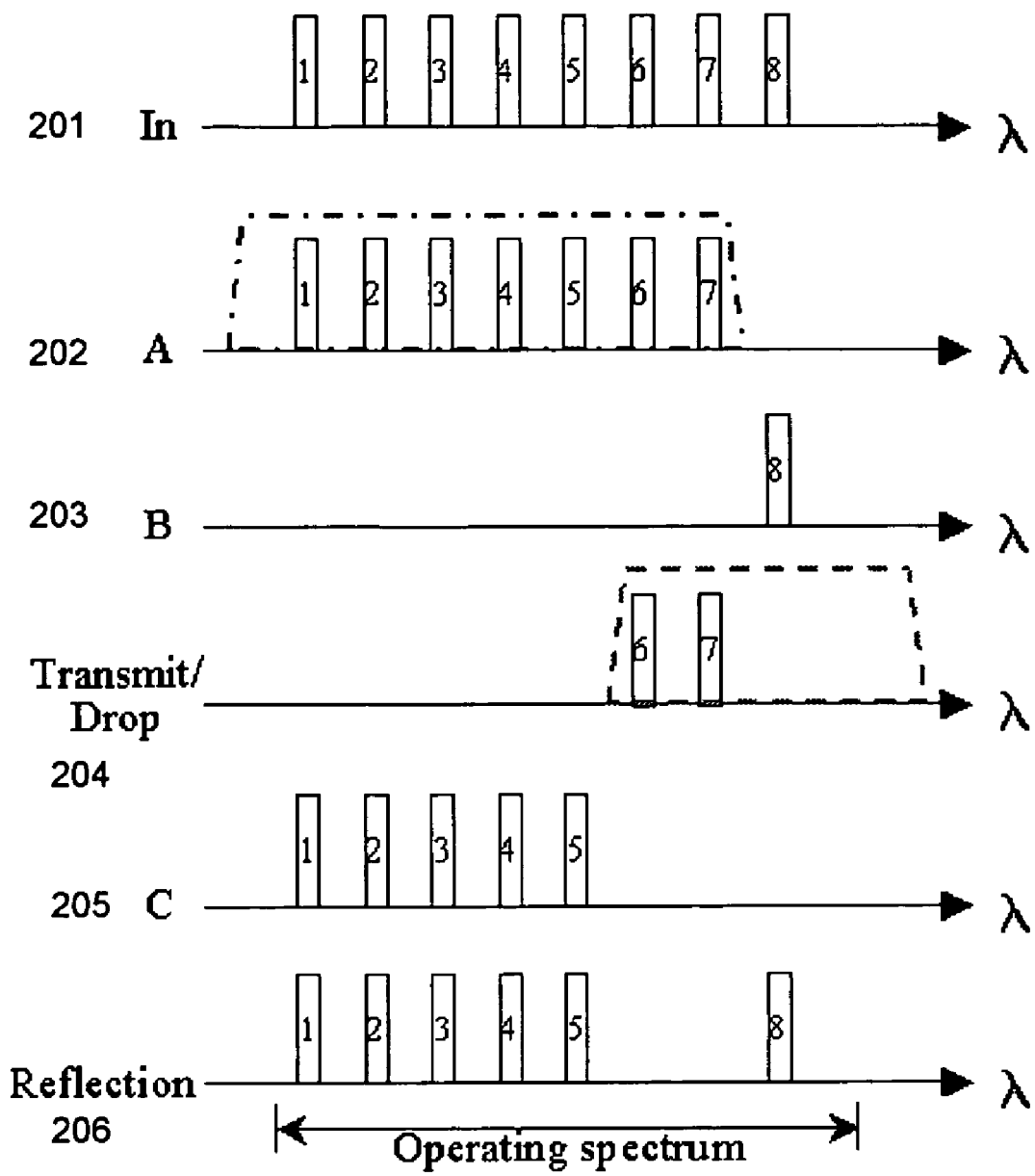
FIG. 2 is a representation of an example spectrum at various points depicted in FIG. 1, illustrating the operation of the flexible band tunable filter.

The operation of the flexible band tunable filter in FIG. 1 is further illustrated by FIG. 2, which is a representation of the spectrum at each point in FIG. 1. An 8-channel example is illustrated. Each spectrum representation 201, 202, 203, 204, 205, 206 corresponds to a signal 101, 102, 103, 104, 105, 106 shown abstractly in FIG. 1. In FIG. 2, it is assumed that the incident signal 201, without limitation, has eight channels and that the flexible band tunable filter has been tuned to drop channels six and seven. The low wavelength tunable edge filter 110 is tuned to a position so that its falling edge is between channel seven and channel eight, so that its passband includes channels one to seven, as depicted in 202 in FIG. 2. This corresponds to point "A" 101 in FIG. 1. The passband of the edge filter is depicted by a dotted and dashed line. As depicted in 203 in FIG. 2, channel eight is reflected/rejected at point "B" (103 in FIG. 1). At the same time, the high wavelength tunable edge filter 120 is tuned to a position so that its rising edge falls between channels five and six, so that all channels higher than channel five within the operating spectrum will be dropped. This is depicted in 204 in FIG. 2. In this case, these channels include channels six and seven, which are the final drops of the flexible band tunable filter. The passband of the edge filter 120 is depicted by the dashed line. At 205 in FIG. 2, the rest of the channels are reflected/rejected, which are channels one to five in this case at point "C" (105 in FIG. 1).

Note that although FIG. 1 and FIG. 2 depicts the application of a "low pass" edge filter before a "high pass" edge filter, this is not required for purposes of the invention. The edge filters can be applied in any advantageous order. Thus, application of a high wavelength tunable edge filter before the low wavelength tunable edge filter results in the same channels dropped by the flexible band tunable filter.

Figure 3:
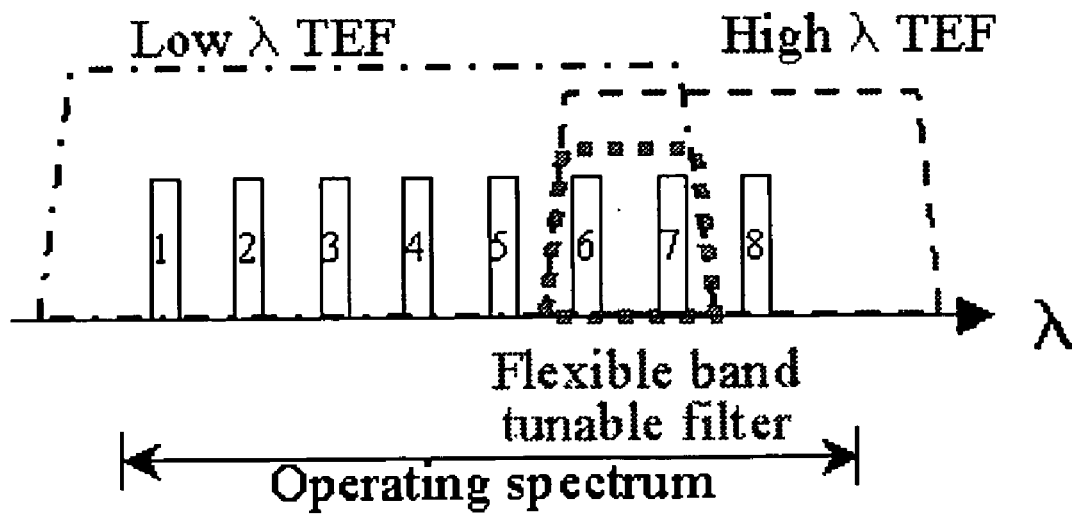
FIG. 3 illustrates the operating spectrum of the flexible band tunable filter, using wide bandpass filters as edge filters.
Figure 4:
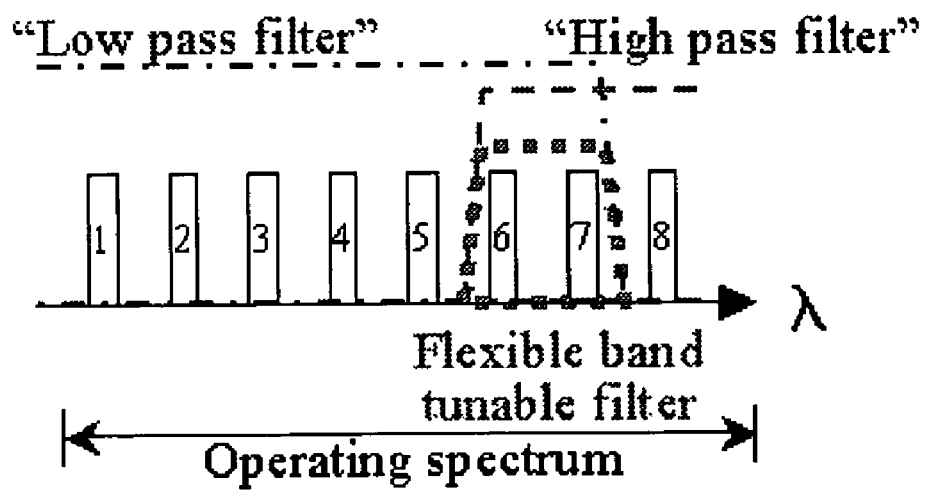
FIG. 4 illustrates the operating spectrum of the flexible band tunable filter, using low and high pass filters as edge filters.

The passband of the flexible band tunable filter represents the intersection of the passbands of the two tunable edge filters. This is illustrated in FIGS. 3 and 4. The passband of the flexible band tunable filter is represented by the dark dotted line. The passbands of the tunable edge filters are represented by the dashed line and the dotted-and-dashed line, respectively. As shown in FIG. 4, the edge filters can operate as true high or low pass filters. Alternatively, and in accordance with an embodiment of another aspect of the invention, the edge filters can operate as filters with a very wide passband, as depicted in FIG. 3. The edge filters 110, 120, in effect, can be bandpass filters with a wide passband and with one rising or falling edge that lies outside the operating spectrum. For example, edge filter 110 can be illustratively a "low pass" edge filter with a very wide passband having a rising edge with a very low wavelength, e.g. that would be outside the operating spectral spectrum. Likewise, edge filter 120 can be a "high pass" edge filter with a wide passband whose rising edge falls within the operating spectrum while its falling edge falls in a high wavelength region.

Figure 5:
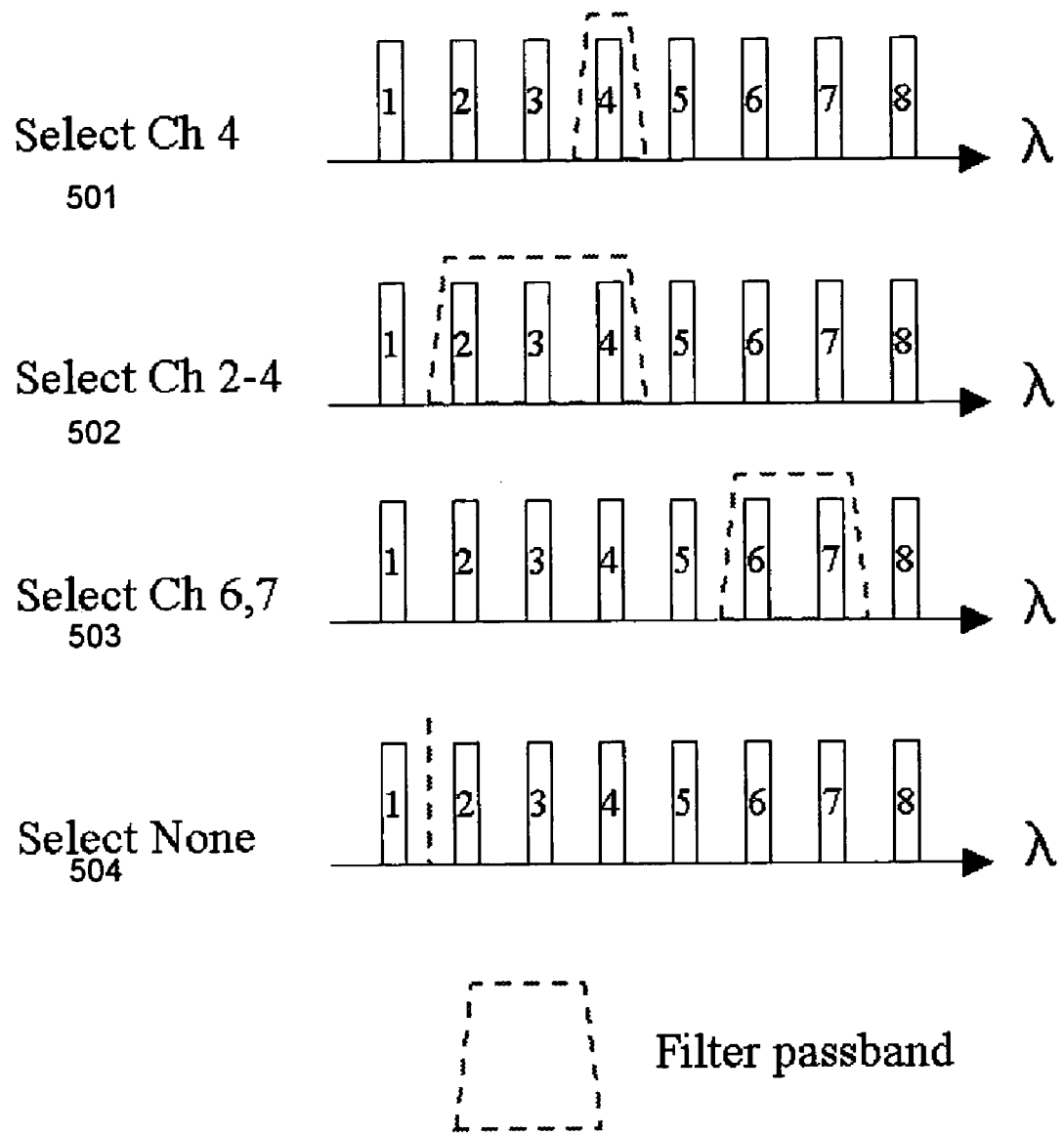
FIG. 5 illustrates different filtering possibilities of the flexible band tunable filter.

Utilizing the flexible band tunable filter, any single channel or multiple of adjacent channels (waveband) can be filtered out—or it can allow the whole spectrum to be reflected with no optical signal at the transmit port. The wide range of filtering possibilities is illustrated by FIG. 5. Any single channel can be filtered out, as shown in 501. Any multiple of adjacent channels (waveband) can be filtered out, as shown in 502, 503. Or the whole spectrum can be allowed to reflect with no optical signal at the transmit port, as shown in 504. The flexible band tunable filter can effectively be tuned in two degrees of freedom: the center wavelength of the filter's passband and the width of the passband can be tuned dynamically using external electronics control. The two degrees of freedom can also be expressed as the wavelengths of the rising and falling edges of the filter passband. Since it is both flexible in passband width and tunable spectrally, the inventors refer to it as a "flexible band tunable filter."

It is advantageous to output separately the channels that have not been dropped. This can be readily implemented in accordance with an embodiment of another aspect of the invention. With reference again to FIG. 1, the reflected bands at point "B" 103 and point "C" 105 can be combined by some form of combiner. The inventors use the term "combiner" to refer to any form of device that can combine the signals, such as, for example, a 1×2 coupler 130 or a beam combiner. The signal, which would then contain all channels except the dropped channels, could be sent to a final reflection port 106. With reference to the illustrative spectrum in FIG. 2, the reflection port signal would contain all channels except the dropped channels six and seven, as depicted at 206.

Figure 6:
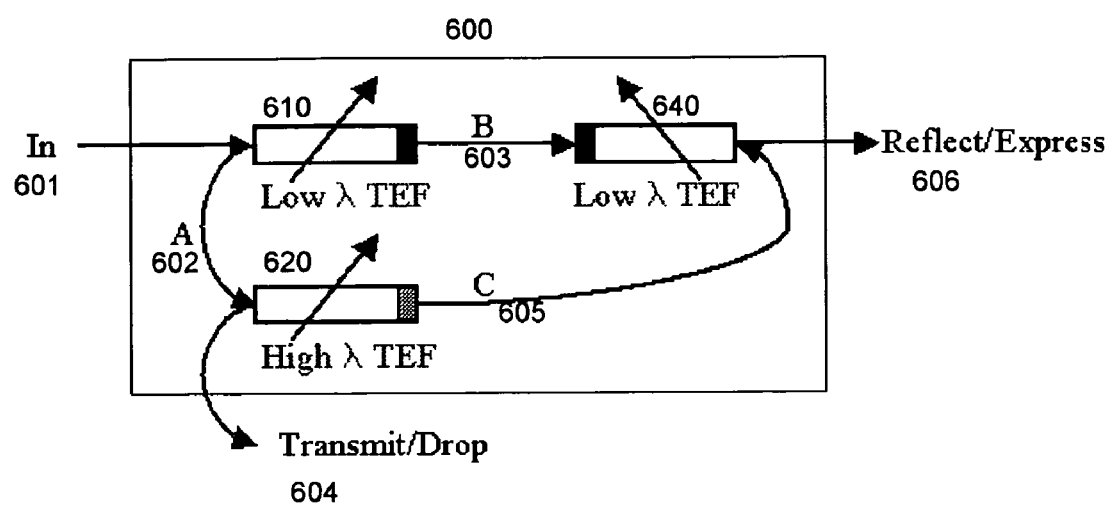
FIG. 6 is a schematic representation of the components of a flexible band tunable filter, in accordance with another embodiment of the present invention.
Figure 7:
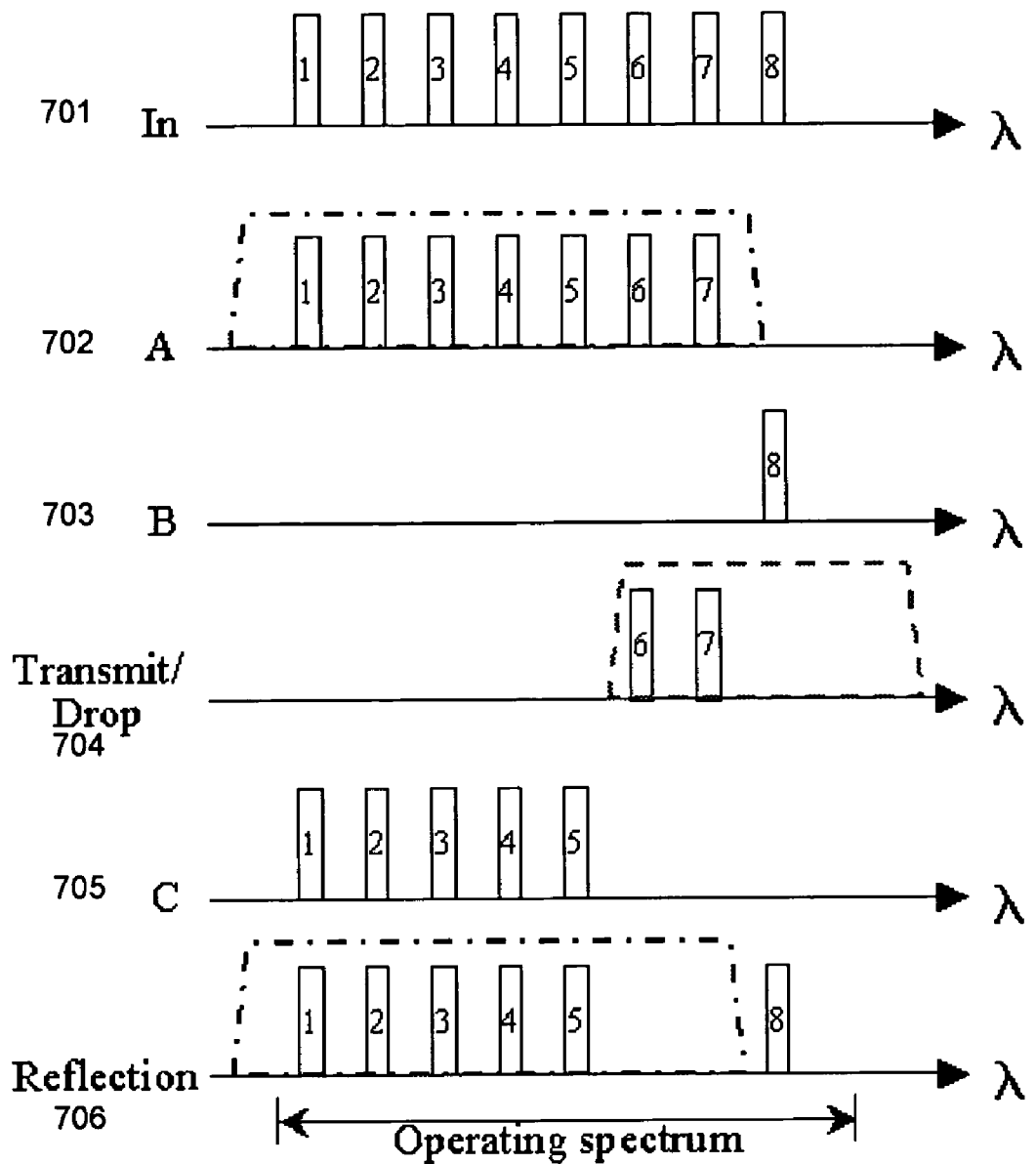
FIG. 7 is a representation of an example spectrum at various points depicted in FIG. 6, illustrating the operation of this version of the flexible band tunable filter.

In accordance with another embodiment of this aspect of the invention, it can be advantageous to use a third edge filter to combine the two reflection bands from the first and second edge filters. This is depicted in FIG. 6. The flexible band tunable filter 600 similarly comprises two tunable edge filters 610, 620. Rather than using a 1×2 coupler at the reflection point, another tunable edge filter 640 is used to combine the two reflection bands, as depicted in FIG. 6. The edge filter 640 at the reflection port would be configured similarly to the edge filter 610 at the input port (where edge filter 610 is a low wavelength edge filter, edge 640 would similarly be a low wavelength edge filter) and would be tuned simultaneously with the same tuning position. FIG. 7 reflects an illustrative spectrum representation 701, 702, 703, 704, 705, 706 that corresponds to a signal 601, 602, 603, 604, 605, 606 shown in FIG. 6. This approach shown in FIG. 6 would be more costly than the embodiment shown in FIG. 1, due to the additional edge filter required, but could also provide improved optical performance. The insertion loss of the edge filter would typically be lower than the insertion loss through a 1×2 coupler. More importantly, the isolation at the output reflection port could be improved significantly with the additional edge filter at the output reflection port. This is because all of the reflected channels go through two filters in cascade before reaching the output, which means that they are filtered twice. Having good isolation performance could ensure that the residual signals of unwanted channels do not affect the output signals.

It should be noted that in most current practical implementations, the slopes of both edges of the filter passband cannot be changed. Therefore, if a filter is designed and fabricated to operate in a network with channel spacing of 200 GHz, for example, it will likely not be suitable to operate in a 100 GHz channel spacing network. And if the filter edges have a profile, such as a "skip-1" profile, all of the selected passbands will have the "skip-1" characteristics too.

Figure 8:
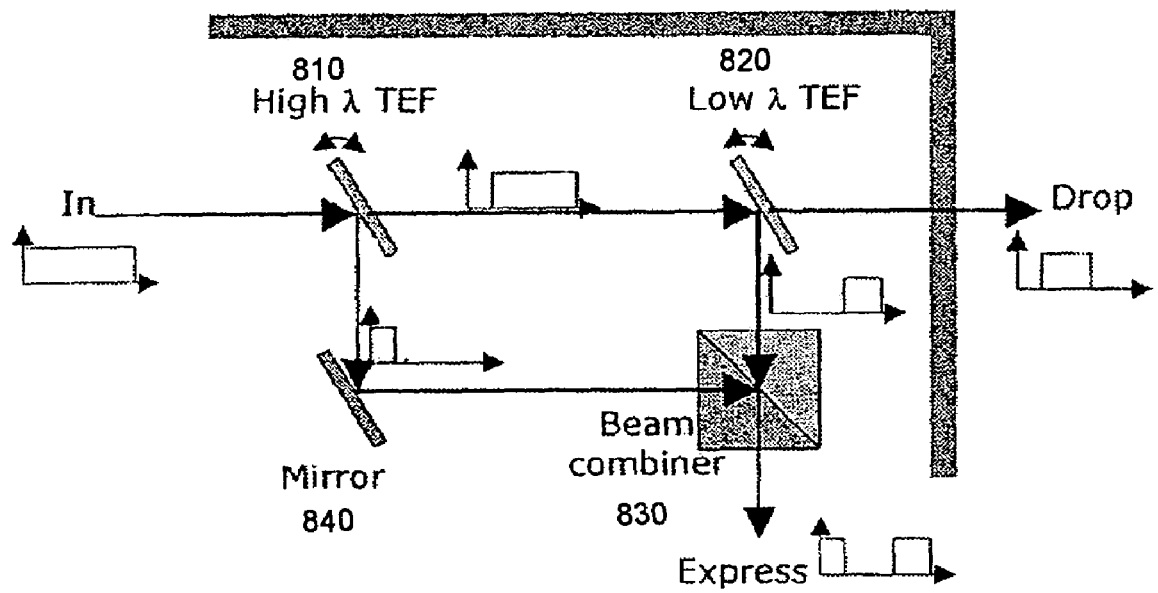
FIG. 8 and FIG. 9 are schematic representations of embodiments of the flexible band tunable filter using mechanically tunable Fabry-Perot interferometer filters.
Figure 9:
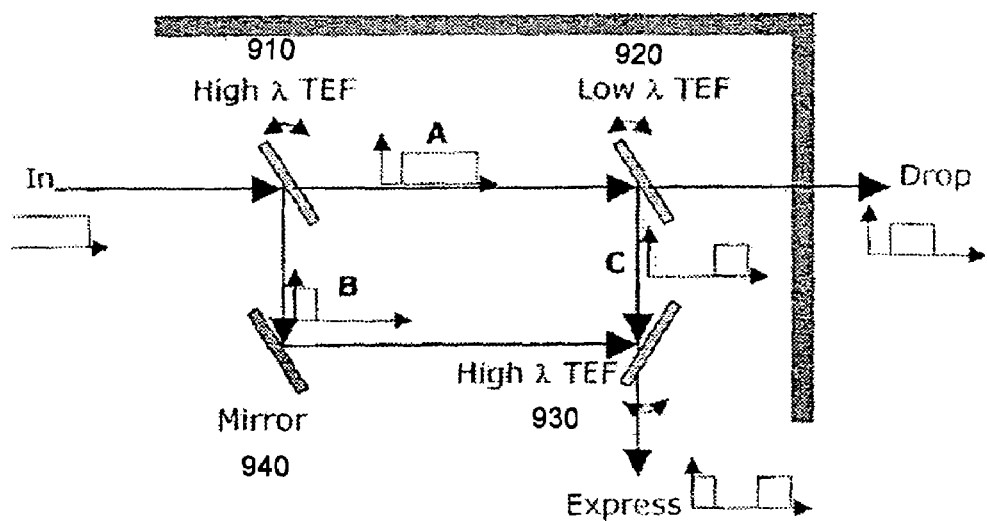

As mentioned above, the edge filters can be implemented using any of a wide array of known techniques for filtering of optical signals. For example and without limitation, FIGS. 8 and 9 are illustrative schematic designs for the flexible band tunable filter that utilize mechanically tunable Fabry-Perot interference filters. Each edge filter 810, 820 in FIG. 8 and 910, 920, 930 in FIG. 9 is a prism that has been coated with a carefully selected dielectric thin film. The thin film contains multiple layers that act as a Fabry-Perot interferometric cavity. See, e.g., H. J. R. Dutton, "Understanding Optical Communications," pp. 229–234 (September 1998), which is incorporated by reference herein. The structure transmits only certain wavelengths, for which the cavity is said to be in resonance—a condition obtained by appropriately adjusting the cavity parameters. At resonance, the cavity transmits a series of equally spaced wavelengths, the spacing between the wavelengths called the free spectral range (FSR) of the cavity. The relationship between the passband center wavelength λ and the parameters of the Fabry-Perot interferometer can be expressed as:

$$\lambda = \frac{2 \times n \times L \cos\theta}{m}$$

where n is the refractive index of the dielectric material, L is the length of the dielectric Fabry-Perot cavity inside the thin film, θ is the incident angle of the ray with respect to the thin film surface, and m is an arbitrary positive integer. The center wavelength λ can be tuned by using a precision stepper motor installed on the prism so as to rotate the prism and thereby vary the incident angle θ. (It should be noted that other technologies can be utilized to tune the passband wavelength, such as, without limitation, varying the refractive index n or the cavity length L.)

A prototype system has been constructed using 200 GHz mechanically tunable Fabry-Perot filters constructed by Optoplex Corp. These wide band tunable filters have a tuning range of approximately 30 nm (from 1530 nm to 1560 nm), which is suitable for a 200 GHz DWDM system with an operating wavelength ranging, for example, from 1530.33 nm to 1562.23 nm. Each tunable filter has an electronic controller which drives the stepper motor and which can interface to a control device such as a computer. Since the tunable filters constructed by Optoplex have slightly better optical performance in the Input to Express path compared to the Input to Drop path, it is advantageous to exchange the function of the Drop and Express ports on the tunable filters. This is merely a change in notation regarding the port designations and does not affect the principle of the design of the flexible band tunable filter. Thus, with reference to the schematic shown in FIG. 1, the Express port of the first tunable filter is connected to the Input port of the second tunable filter (long wavelength) via an FC adapter at Point A. The Drop ports of both tunable filters (at points B and C) are connected to the two inputs of a 1×2 coupler via FC adapters. The Express port of the second tunable filter serves as the Transmit/Drop port of the flexible band tunable filter and the common port of the coupler serves as the Reflect/Drop port of the flexible band tunable filter.

FIG. 10 to 19 illustrates the optical performance of the prototype system. Measurements were taken using an Agilent Technologies 81910A Photonic All-parameter Analyzer with an 8164B low SSE fast tunable laser used as the light source and high precision power sensors (Agilent 81635A or 81634B). The measurement wavelength range was set to 1520 to 1570 nm (which covers the whole c-band spectrum as defined by the ITU-T) using a sampling size of 5 pm per step. For phase measurements, the resolution bandwidth was set to 50 pm, which means that every neighboring 10 sampling points are used to calculate the phase measurement value at any point through weighted averaging. Each phase measurement was repeated 30 times to get the average. Each loss measurement takes two sweeps to gain a large dynamic range.

Figure 10:
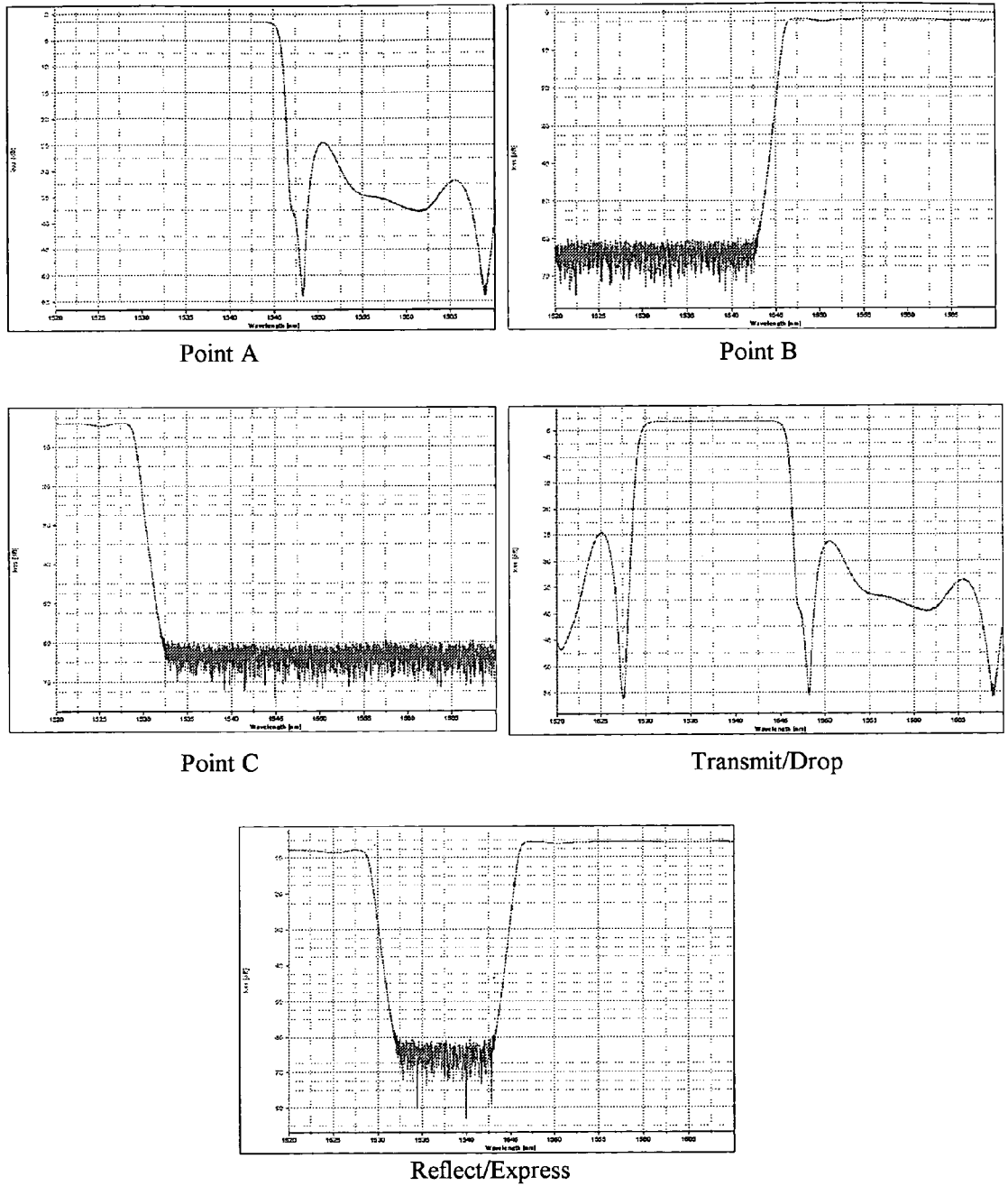
FIG. 10 through FIG. 19 are various charts illustrating the optical performance of a prototype system using mechanically tunable Fabry-Perot interferometer filters.
Figure 11:
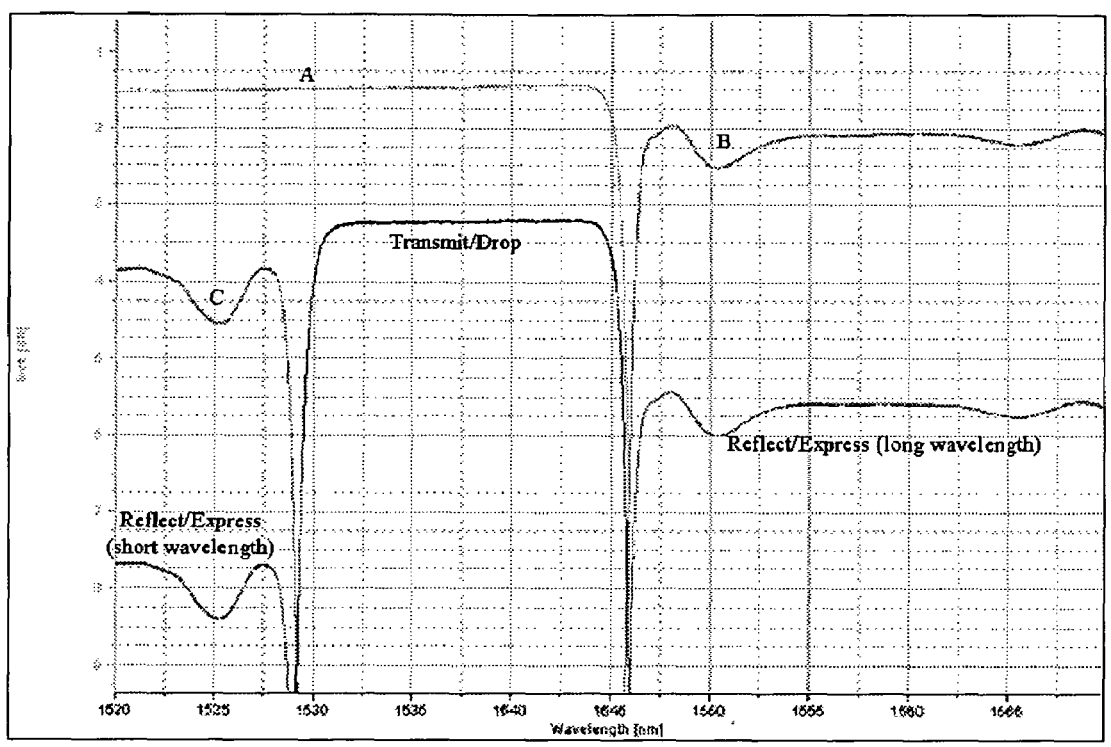

FIG. 10 shows the insertion loss profile at different points of interest in the system (corresponding to the points shown in FIG. 1) for a passband from about 1532 nm to about 1544 nm. This band covers about eight DWDM channels at 200 GHz channel spacing. The input light is split into two sections through the short wavelength tunable edge filter: the spectrum with wavelength longer than the selected value (about 1545.9 nm) is sent to the 1×2 coupler (point B), while the shorter wavelength section is sent to the input of the second tunable edge filter (point A). The second edge filter (long wavelength tunable edge filter) then further splits this spectrum into two sections: the section with wavelength shorter than the selected value (about 1529.2 nm) is sent to the second input of the 1×2 coupler (point C), while the rest is the drop passband (Transmit/Drop). The 1×2 coupler combines the spectrum sections at point B and C to form the express output (Reflect/Express). FIG. 11 shows a zoomed-in view of the peaks of the measured insertion loss curves, from which the insertion loss values at each point can be obtained. The maximum insertion loss at Point A is 1.55 dB (which is lower than a theoretical value of 1.8 dB based on the specifications for the Optoplex tunable filter). The insertion loss values are 2.54 dB at point B (theoretical value of 2.54 dB), 4.56 dB at point C (theoretical value 4.1 dB), 3.28 dB at Transmit/Drop port (theoretical value 3.6 dB), 8.4/6.0 dB at Reflect/Express port (theoretical value 7.4/5.6 dB).

These result show that the actual insertion loss values are similar to the theoretical prediction, with some lower and some higher. The Express ports of both tunable edge filters have smaller insertion loss than the value on the specifications, while the Drop ports have larger loss figures. This appears to be mainly due to the ripple at the Drop ports, which is significant near the filter edge (shown as the peak and the valley). The measured ripple at the Drop ports is about 0.74 dB (0.8 dB on the specification). Large loss ripple near the filter edge is an intrinsic problem that comes with a filter coating layer design, especially for a filter with a very wide band and steep passband edge such as these edge filters.

It should also be noted that FC/PC connectors were used for all fiber joints in the measurement, therefore an additional loss of up to 0.4 dB is introduced at each joint because of the loss due to both FC/PC connector and FC adaptor in between. This 0.4 dB additional loss can be readily avoided by known techniques, such as joining all the fibers via splicing.

Figure 12:
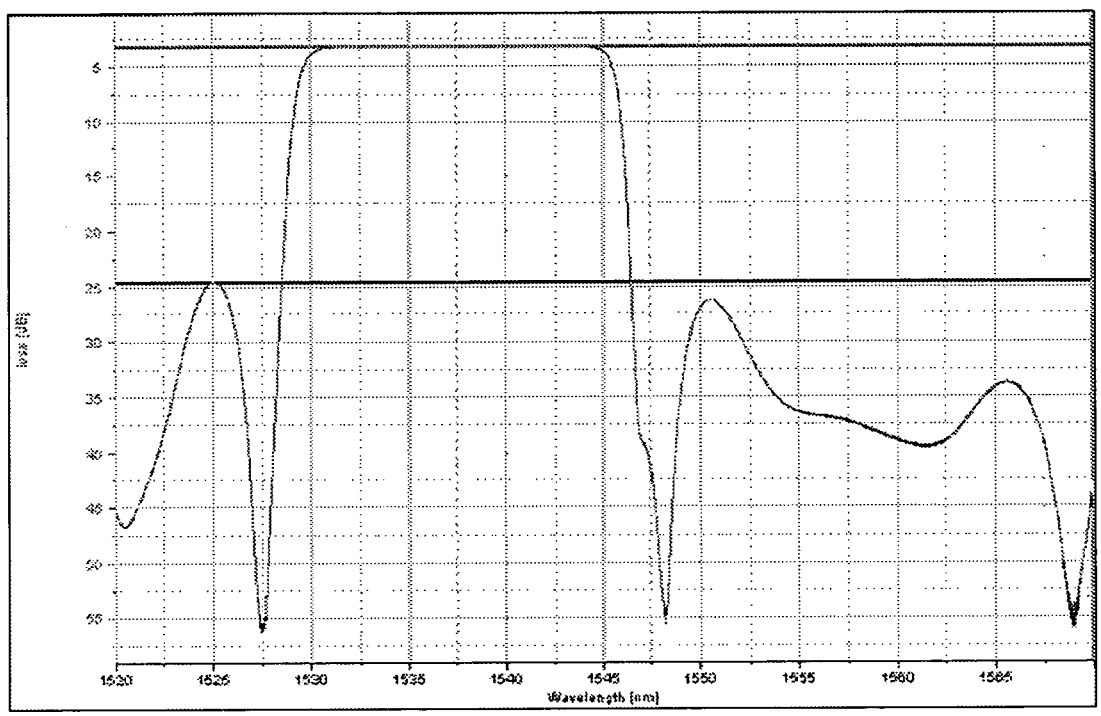

FIG. 12 shows the isolation result at the Transmit/Drop port. The isolation performance is poor (below 22 dB), as is expected given current isolation levels achievable by such tunable filters are typically only 20 to 30 dB. For the Reflect/Express port, the measured isolation performance is better than the specified value of 30 dB. The location of the peak (with worst isolation) at the Transmit/Drop port corresponds exactly with valley in the Reflect/Express port (both at 1525 nm), because it is also related to the filter coating layer design. The poor isolation could lead to excessive residue of the unwanted signal (for example, the signal at 1525 nm in this case) on the Transmit/Drop output, which at the next stage could in turn lead to crosstalk with other signals at the same wavelength that is multiplexed with the passband. As mentioned above, one way to improve the isolation performance of the fixed band tunable filter is to replace the 1×2 coupler with another tunable edge filter at the Reflect/Express output.

Figure 13:
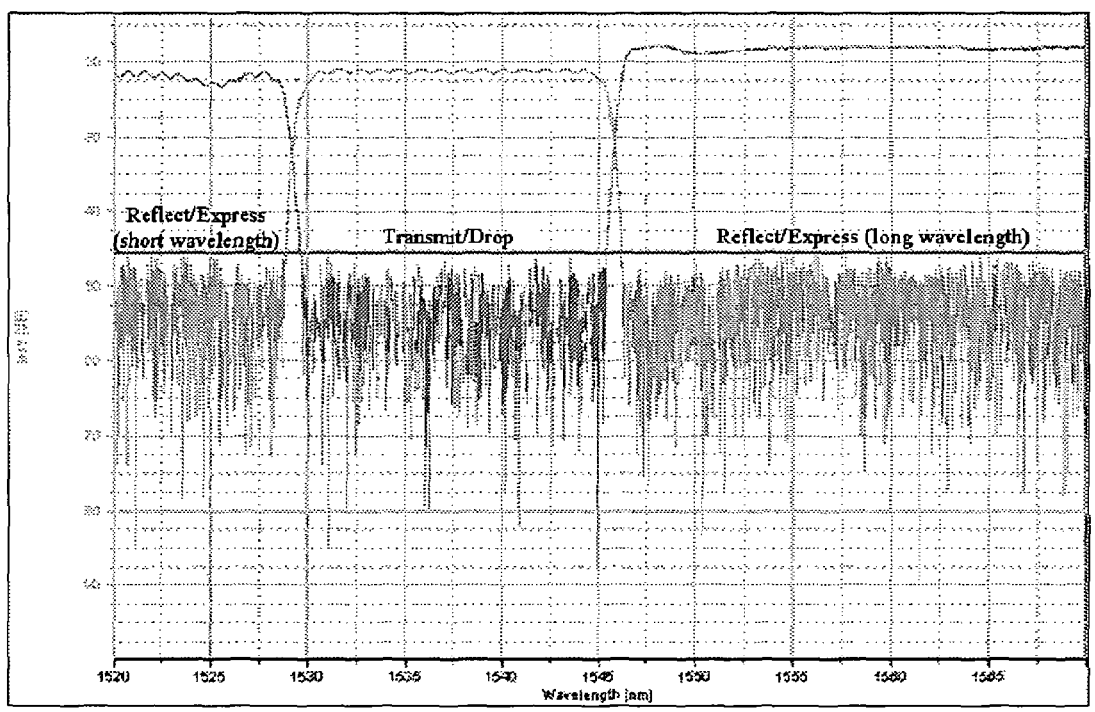
Figure 14:
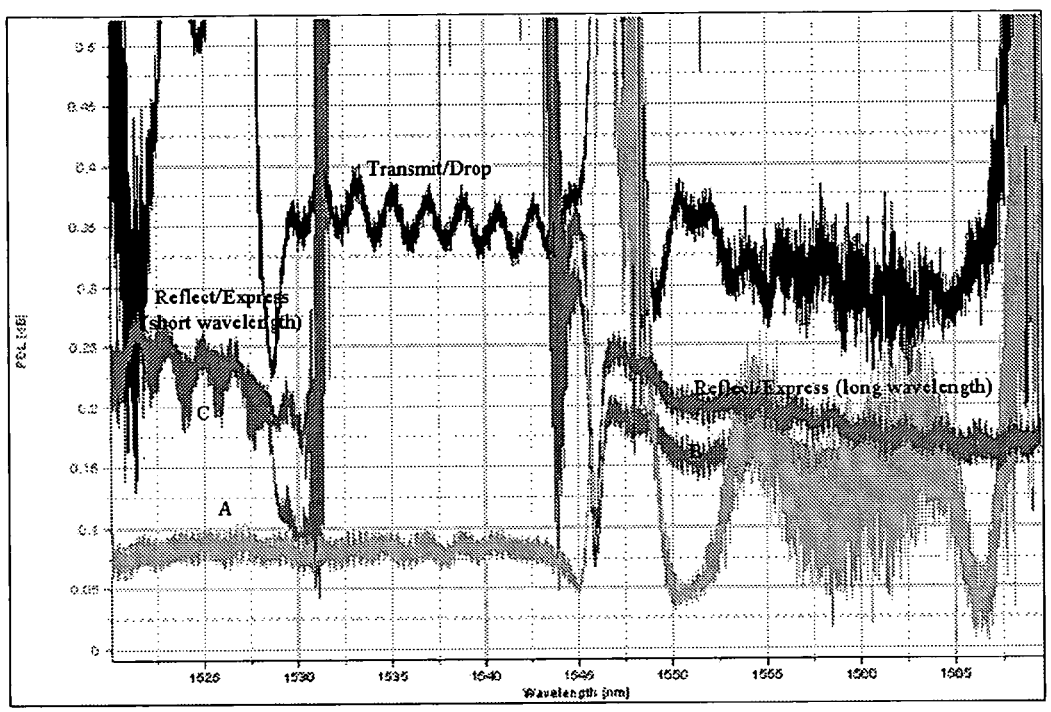
Figure 15:
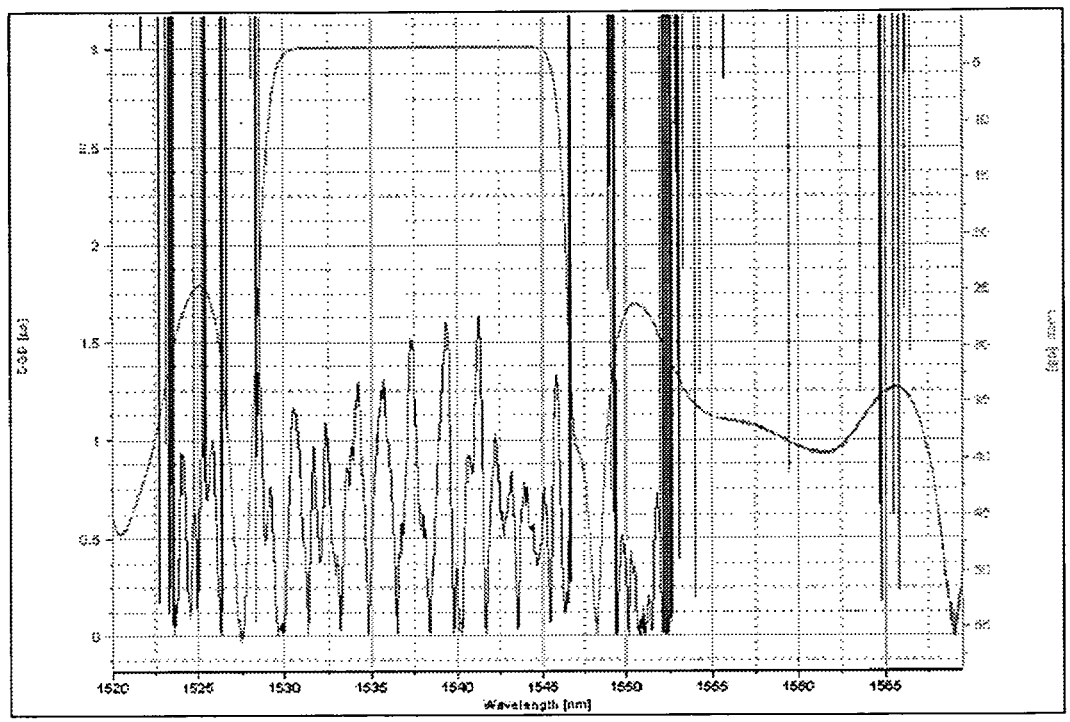
Figure 15:
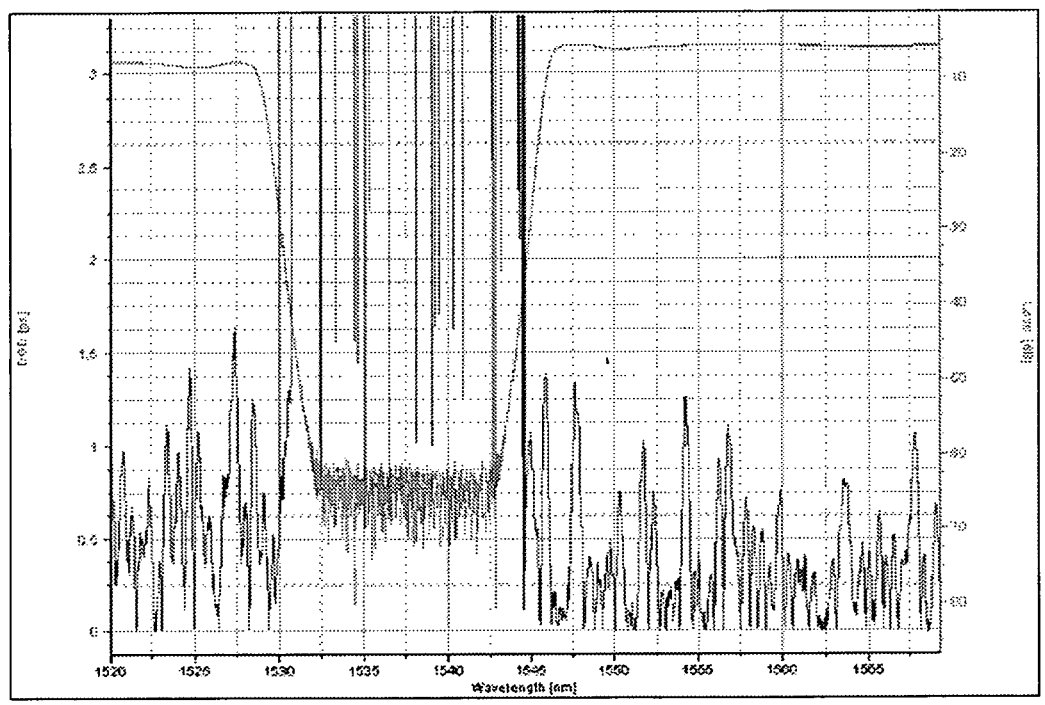
Figure 16:
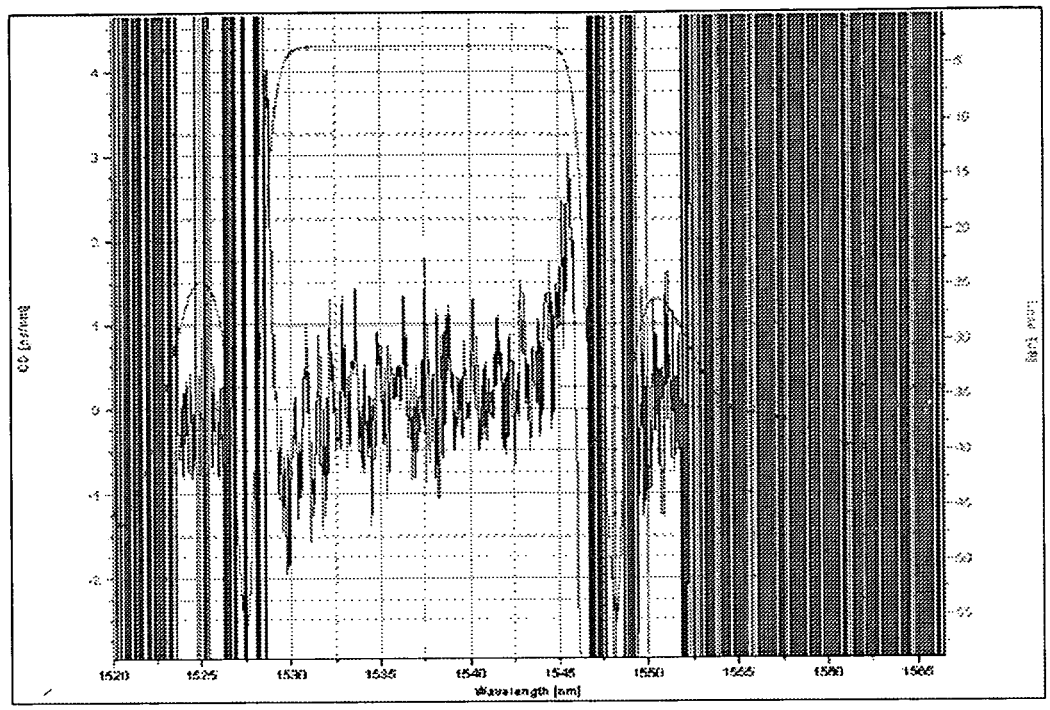
Figure 16:
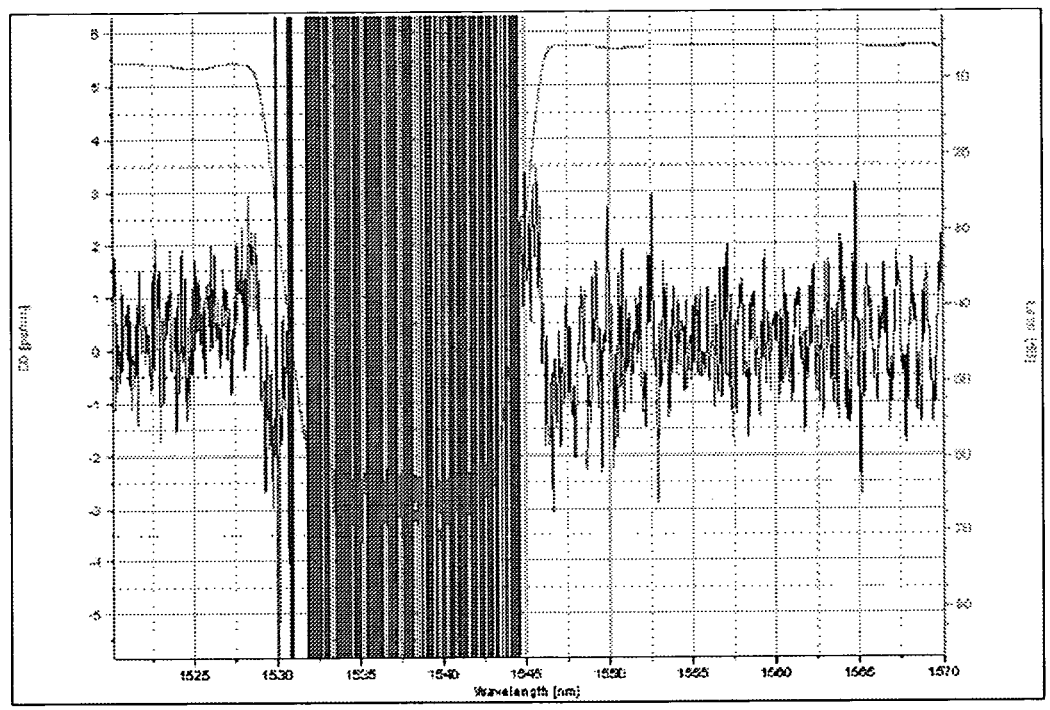

FIG. 13 shows the measured return loss profiles at Transmit/Drop and Reflect/Express ports. The return loss at the respective useful spectral region (such as the passband region for the Transmit/Drop port and the reflection region for the Reflect/Express port) is below 45.5 dB. This value is slightly lower than the specified value of 50 dB, which it is suspected could have been improved through the use of APC connectors. FIG. 14 shows the polarization dependent loss (PDL) profiles at all measurement points. All the measured PDL values are below 0.4 dB in the respective useful region of each port, which are smaller than the theoretical expected value of 0.6 to 0.65 dB. FIGS. 15(a) and (b) are the differential group delay (DGD) profiles at the Transmit/Drop port and Reflect/Express port respectively. The maximum polarization mode dispersion (PMD) is defined as the spectral average of DGD. The calculated PMD value is 0.70 ps for the passband at the Transmit/Drop port. For the Reflect/Express port, the calculated PMD value is 0.61 ps for the short wavelength spectrum section and 0.36 ps for the long wavelength spectrum section. Most of these values are larger than the expected value of 0.4 ps. Apart from the performance of the physical devices, the cause of this increase of PMD value may also include the slight vibration at the measurement environment. FIGS. 16(a) and (b) are the chromatic dispersion (CD) profiles of the Transmit/Drop port and Reflect/Express port respectively. The measured CD values are less than ±3 ps/nm. This result is satisfactory for most of the applications in current DWDM networks.

Figure 17:
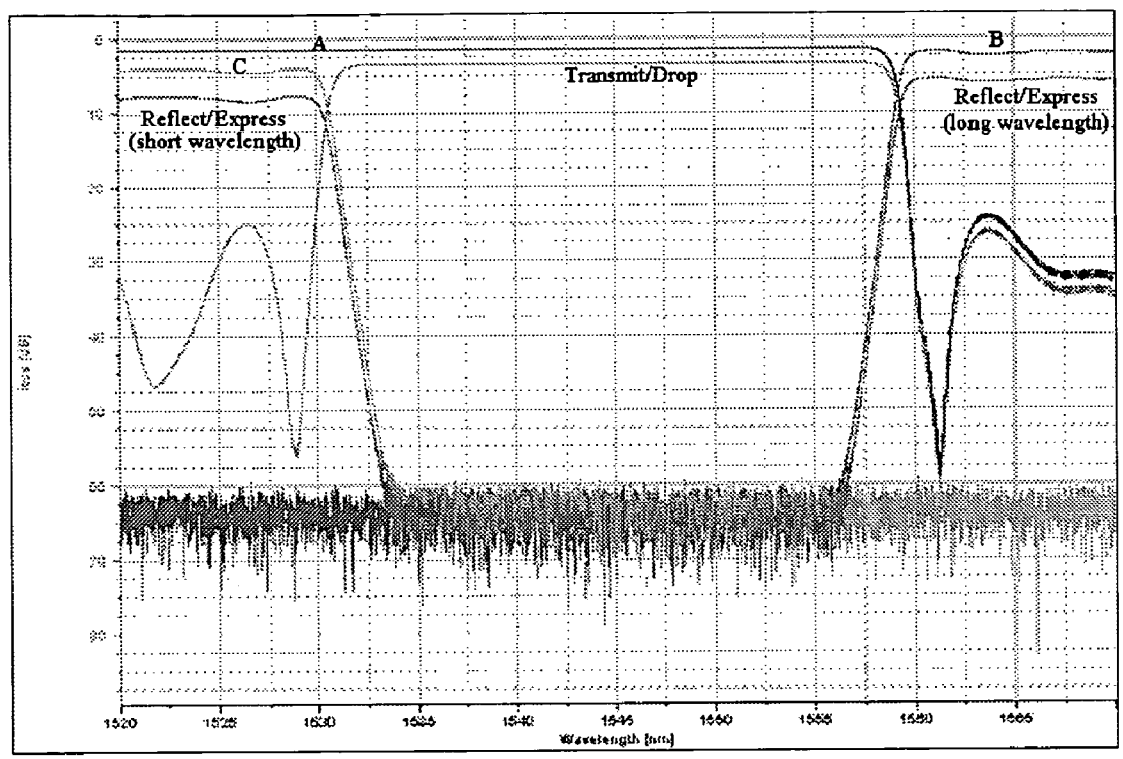
Figure 18:
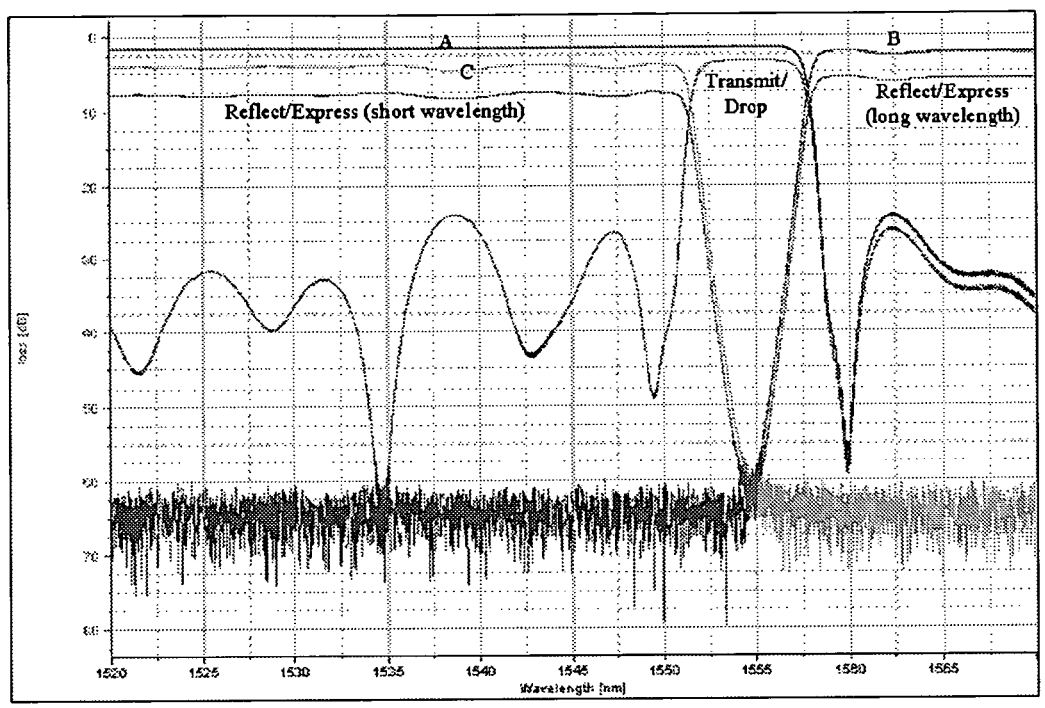
Figure 19:
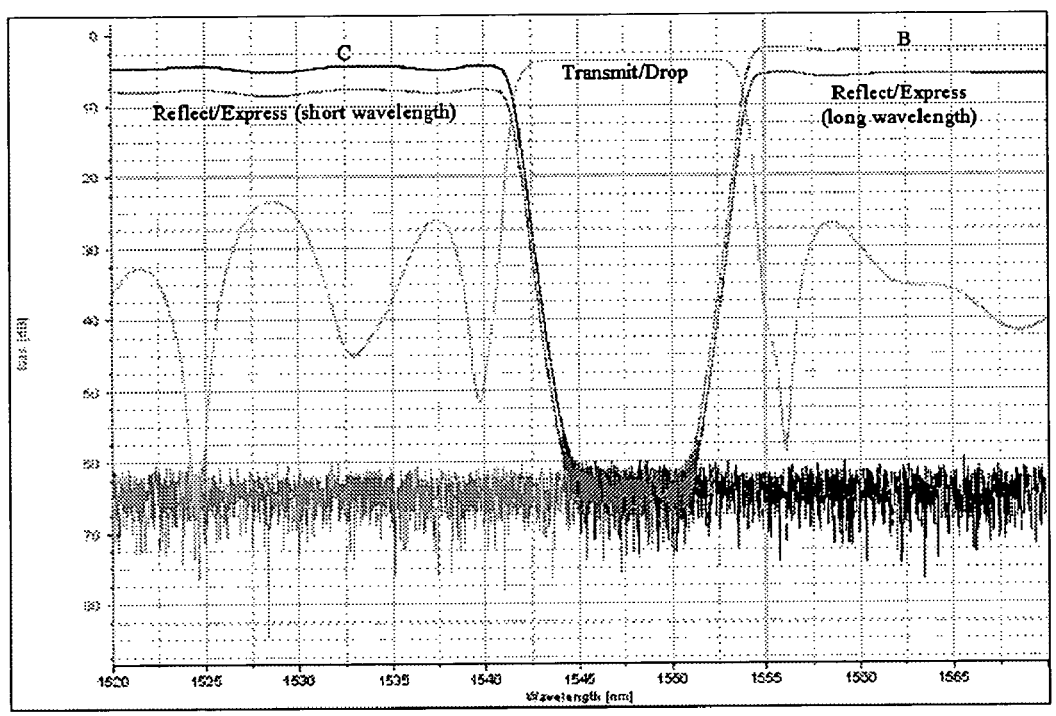

FIGS. 17, 18 and 19 show the insertion loss spectra of measurement points when the flexible band tunable filter is tuned to other positions, as indicated. These filter settings includes different filter passband widths and different passband center wavelength. The optical performance at these tuning positions are similar to those obtained at the first position discussed above.

Figure 20:
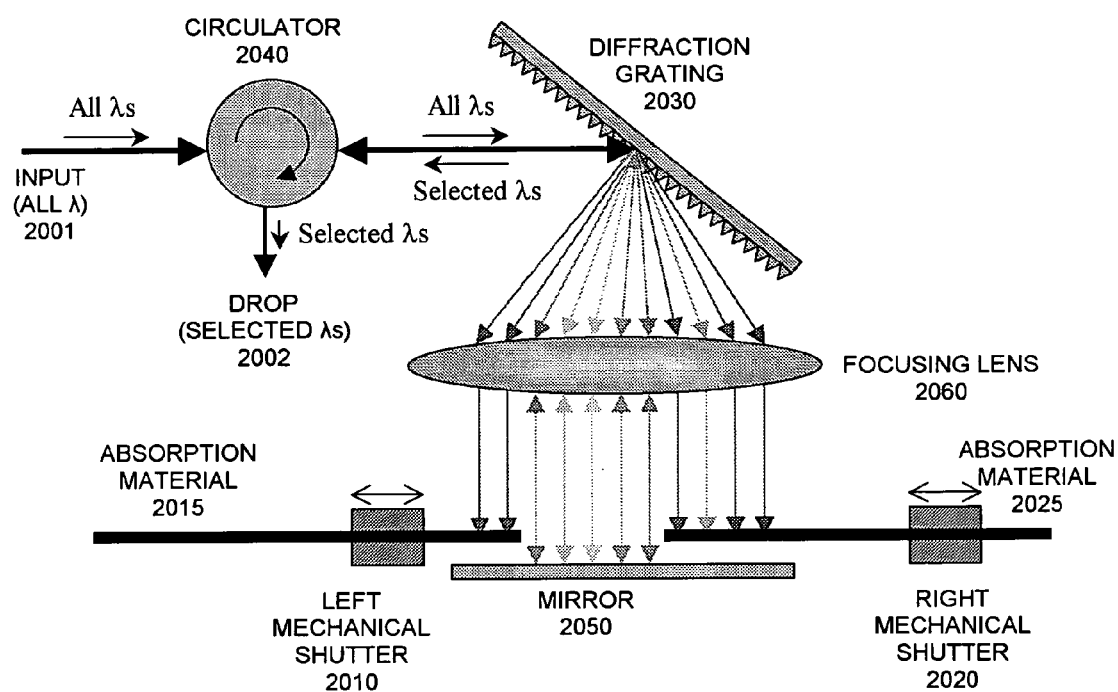
FIG. 20 is a schematic representation of the components of a flexible band tunable filter, in accordance with another embodiment of the present invention.

FIG. 20 is a schematic representation of another embodiment of the flexible band tunable filter. As depicted in FIG. 20, the wavelengths in the input light 2001 are separated using a diffraction grating 2030. The spectrally dispersed rays are directed onto a mirror 2050. It is preferable to use some form of focusing lens 2060, as shown in FIG. 20. A pair of mechanical shutters 2010, 2020, arbitrarily designated "left" and "right" in FIG. 20, serve to control the portion of the spectrum that can reach the mirror 2050. The shutters can be moved, e.g., mechanically by a precise motor. The portion of the light that reaches the mirror 2050 is reflected back along the incident path and directed the a drop port 2002 via the circulator 2040. The rest of the light is blocked by the mechanical shutters 2010, 2020 and is rejected (or can be collected with an additional mechanism). Since the selected drop channels travel the exact opposite path back to the circulator, the polarization effect is advantageously minimized.

The different embodiments of the flexible band tunable filter can be used in optical network devices to simplify the network architecture. It can potentially provide gains in flexibility of network control while increasing the network throughput and performance. It can also facilitates faster provisioning and protection, ease of network operation and network migration. It will be appreciated that those skilled in the art will be able to devise numerous arrangements and variations which, although not explicitly shown or described herein, embody the principles of the invention and are within their spirit and scope. For example, and without limitation, the present invention has been described in particular with regard to wavelength division multiplexing and optical networking applications. Nevertheless, the principles of the present invention are readily extendable to other forms of multiplexing and other forms of applications.

What is claimed is:

1. A device for an optical communication network comprising:
    a first tunable edge filter that is adapted to receive an input signal and to drop a first range of channels in the input signal;
    a second tunable edge filter that is adapted to receive a dropped signal from the first tunable edge filter and that is adapted to drop a second range of channels from the dropped signal from the first tunable edge filter, such that an intersection between the first range of channels and the second range of channels defines a tunable passband for the device; and
    a third tunable edge filter that is adapted to receive a first rejected signal from the first tunable edge filter and a second rejected signal from the second tunable edge filter and to create an output signal that includes channels not in the tunable passband for the device.

2. The device of claim 1 wherein the tunable edge filters are bandpass filters with a wide passband having a rising or falling edge that lies outside an operating spectrum for the device.

3. The device of claim 1 wherein the tunable edge filters are high or low pass filters.

4. The device of claim 1 wherein the tunable edge filters further comprise components selected from a group comprising Fabry-Perot interferometers, bulk diffraction gratings, fiber Bragg gratings, planar liglitwave circuits, arrayed waveguide gratings, thin film interference, and Mach-Zender interferometers.

5. The device of claim 1 wherein the signals are wavelength division multiplexing signals.

6. A method for filtering an optical communication signal comprising:
   receiving an input signal;
   dropping a first range of channels in the input signal using a first tunable edge filter;
   dropping a second range of channels from a signal comprising the first range of channels dropped from the first tunable edge filter using a second tunable edge filter, such that an intersection between the first range of channels and the second range of channels defines a tunable passband; and
   combining a first rejected signal from the first tunable filter and a second rejected signal from the second tunable edge filter, thereby creating a third rejected signal that includes channels not in the tunable passband.

7. The device of claim 6 wherein the signals are wavelength division multiplexing signals.

8. A device for an optical communication network comprising
   a diffraction grating that receives an input signal and creates a spectrally dispersed signal;
   a pair of shutters that selectively block portions of the spectrally dispersed signal so as to define a tunable passband for the device;
   a mirror which directs portions of the spectrally dispersed signal not blocked by the pair of shutters back along a reverse path to the diffraction grating which recreates an output signal missing channels that were in the blocked portions of the spectrally dispersed signal; and
   a circulator which directs the output signal to a drop port.

9. The device of claim 8 wherein the signals are wavelength division multiplexing signals.

10. A device for an optical communication network comprising:
    a first tunable edge filter that is adapted to receive an input signal and to drop a first range of channels in the input signal; and
    a second tunable edge filter that is adapted to receive a dropped signal from the first tunable edge filter and that is adapted to drop a second range of channels from the dropped signal from the first tunable edge filter, such that an intersection between the first range of channels and the second range of channels defines a tunable passband for the device; and
    a combiner that is adapted to receive a first rejected signal from the first tunable edge filter and a second rejected signal from the second tunable edge filter and combine the first and second rejected signals to create an output signal that includes channels not in the tunable passband for the device.

11. The device of claim 10 wherein the combiner is a coupler.

12. The device of claim 10 wherein the tunable edge filters are bandpass filters with a wide passband having a rising or falling edge that lies outside an operating spectrum for the device.

13. The device of claim 10 wherein the tunable edge filters are high or low pass filters.

14. The device of claim 10 wherein the tunable edge filters further comprise components selected from a group comprising Fabry-Perot interferometers, bulk diffraction gratings, fiber Bragg gratings, planar lightwave circuits, arrayed waveguide gratings, thin film interference, and Mach-Zender interferometers.

15. The device of claim 10 wherein the signals are wavelength division multiplexing signals.

* * * * *